United States Patent
Jeon

(10) Patent No.: US 7,537,854 B2
(45) Date of Patent: May 26, 2009

(54) POLYMER ELECTROLYTE FUEL CELL AND STACK THEREFOR, AND METHOD OF MANUFACTURING THE SAME

(75) Inventor: Ui Sik Jeon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 776 days.

(21) Appl. No.: 11/008,220

(22) Filed: Dec. 10, 2004

(65) Prior Publication Data

US 2006/0051625 A1 Mar. 9, 2006

(30) Foreign Application Priority Data

Sep. 3, 2004 (KR) .................. 10-2004-0070196

(51) Int. Cl.
*H01M 8/02* (2006.01)
*H01M 8/04* (2006.01)

(52) U.S. Cl. .................. 429/34; 429/35; 429/38; 429/39

(58) Field of Classification Search .................. None
See application file for complete search history.

(56) References Cited

U.S. PATENT DOCUMENTS

| 6,428,921 B1 * | 8/2002 | Grot ............................. 429/37 |
| 2004/0142226 A1 * | 7/2004 | Yamauchi et al. ............. 429/38 |
| 2006/0083975 A1 | 4/2006 | Ahn |

* cited by examiner

*Primary Examiner*—Jonathan Crepeau
(74) *Attorney, Agent, or Firm*—Greenblum & Bernstein, P.L.C.

(57) ABSTRACT

A stack for the fuel cell of the present invention includes a plurality of stacked unit cells each of which includes a conductive separator plate formed with flow passages and manifolds for gas supply, a coupler and attached to both sides of the separator plate and formed with openings and penetrating passages to expose the manifolds and the flow passages, and a membrane-electrode assembly disposed between assemblies of the conductive separator and the couplers.

5 Claims, 7 Drawing Sheets

POLYMER ELECTROLYTE FUEL CELL AND STACK THEREFOR, AND METHOD OF MANUFACTURING THE SAME

RELATED APPLICATIONS

The present disclosure relates to subject matter contained in Korean Application No. 10-2004-0070196, filed on Sep. 3, 2004, which is herein expressly incorporated by reference its entirely.

BACKGROUND OF THE INVENTION

1. Field of the Invention

The present invention relates to a polymer electrolyte fuel cell and a stack therefor, and a method of manufacturing the same. More particularly, the present invention relates to a polymer electrolyte fuel cell and a stack therefor, and a method of manufacturing the same, wherein the stack for the fuel cell is made by attaching thermoplastic elastomer parts to one another to maintain the insulation and sealing of separator plates so that the stack is simplified in structure and reduced in weight, thereby simplifying processes and reducing costs upon manufacture thereof.

2. Description of the Related Art

Since a polymer electrolyte fuel cell (PEFC) has advantages in that it has high current density and low operating temperature and also has no risk of corrosion and electrolyte loss, PEFC has been developed as military or spacecraft power sources. There have been actively conducted studies on applications thereof to automobile or mobile power sources using features by which output density is high and devices can be simplified and formed into modules.

As for the basic structure of the polymer electrolyte fuel cell, the polymer electrolyte fuel cell comprises porous air and fuel electrodes coated with platinum, which is a noble metal catalyst, existing at both ends with respect to a polymer electrolyte membrane, and cell frames for supporting the electrodes and defining gas passages.

Hydrogen acting as fuel is introduced toward the fuel electrode and oxygen or air acting as oxidant is introduced toward the air electrode. Electrical energy is then generated through electrochemical oxidation of the fuel gas and electrochemical reduction of the oxidant. That is, the reduction reaction of the oxygen and the oxidation reaction of the hydrogen occur at the air and fuel electrodes, respectively, resulting in generation of electricity and water.

Thus, in view of the entire cell, hydrogen and oxygen are introduced into the cell and electricity, heat and water are discharged.

Methods of improving the output of a cell include a method of increasing the area of a cell, and a method of connecting a plurality of cells to one another. The increase in the area of a cell causes the voltage of the cell to be constant but an output current to be increased. The connection of the plurality of cells causes an output current to be constant but the voltage of the cells to be increased.

Although each of the both methods can be performed in theory, practicable cells are manufactured by means of a method of improving cell output by appropriately increasing the area of each cell and simultaneously stacking a plurality of unit cells in consideration of the both factors.

The stacking of unit cells means that unit cells with the same size and configuration are connected to one another in series such that a fuel electrode of a first unit cell is brought into contact with an air electrode of a second unit cell. In this case, a cell frame for the fuel electrode of the first unit cell is generally formed not separately from but integrally with a cell frame for the air electrode of the second unit cell, resulting in a separator plate.

Flow passages through which gases flow are formed on both sides of the separator plate such that hydrogen flows through a flow passage on one side and oxygen flows through a flow passage on the other side.

The reaction gases are supplied to the cells from external storage containers and then into the separator plate through cell manifolds. When the reaction gases reach the respective electrodes through the separator plate, electrochemical reactions occur on surfaces of the electrodes.

At this time, hydrogen and oxygen as the reaction gases are supplied to the fuel electrode and the air electrode, respectively. The two gases should not come into direct contact with each other. If the two gases come into direct contact with each other, a combustion reaction occurs instead of an electrochemical reaction and thus electricity is not generated and only heat is generated, which leads to breakage of the cells.

To ensure that the two gases flow through the respective flow passages without mixture thereof, it is necessary to maintain sealing around the gas passages.

FIG. 1 is a view showing the structure of a conventional polymer electrolyte fuel cell. Such a polymer electrolyte fuel cell used as a power source for a fuel cell-powered automobile comprises several dozens to hundreds of serially stacked unit cells 10 consisting of bipolar separator plates 11 serving as current collectors and fuel supply passages, membrane-electrode assemblies 12 and gaskets 13 for ensuring sealing for fuel gas and cooling water; and fasteners 20 such as end plates 21, high-tension bolts 22, and nuts 23 for supporting the stacked unit cells.

However, in the structure of such a stack constructed by stacking several hundreds of unit cells, since gaskets, end plates and fasteners are used as means for maintaining sealing for gases and supporting the stack, there are problems in that the number of parts increases and mass-production thereof is difficult.

SUMMARY OF THE INVENTION

The present invention is conceived to solve the problems in the prior art. An object of the present invention is to provide a polymer electrolyte fuel cell and a stack therefor, and a method of manufacturing the same, wherein the stack for the fuel cell is simplified in structure and reduced in weight, thereby simplifying processes and reducing costs upon manufacture thereof.

According to an aspect of the present invention for achieving the object, there is provided a stack for a polymer electrolyte fuel cell comprising a plurality of stacked unit cells each of which includes a conductive separator plate formed with flow passages and manifolds for gas supply, a coupler attached to both sides of the separator plate and formed with openings and penetrating passages to expose the manifolds and the flow passages, and a membrane-electrode assembly disposed between assemblies of the conductive separator and the coupler.

According to another aspect of the present invention, there is provided a polymer electrolyte fuel cell, comprising a stack of a plurality of unit cells each of which includes a conductive separator plate formed with flow passages and manifolds for gas supply, a coupler attached to both sides of the separator plate and formed with openings and penetrating passages to expose the manifolds and the flow passages, and a membrane-electrode assembly disposed between assemblies of the conductive separator and the coupler; and a fixing unit positioned at both ends of the stack to fix the stack.

According to a further aspect of the present invention, there is provided a method of manufacturing a polymer electrolyte fuel cell, including constructing a structure by disposing membrane-electrode assemblies between couplers attached to both sides of a conductive separator plate, which is formed with manifolds and flow passages for gas supply, and formed with openings and penetrating passages to expose the manifolds and the flow passages; and repeatedly stacking a plurality of structures constructed by bonding the couplers to the separator plates through heating and pressing, thereby simultaneously achieving sealing and configuration of a stack for the fuel cell.

BRIEF DESCRIPTION OF THE DRAWINGS

The above and other objects, features and advantages of the present invention will become apparent from the following description of preferred embodiments given in conjunction with the accompanying drawings, in which.

DETAILED DESCRIPTION OF THE INVENTION

Hereinafter, preferred embodiments of the present invention will be described in detail with reference to the accompanying drawings.

Figure 1:
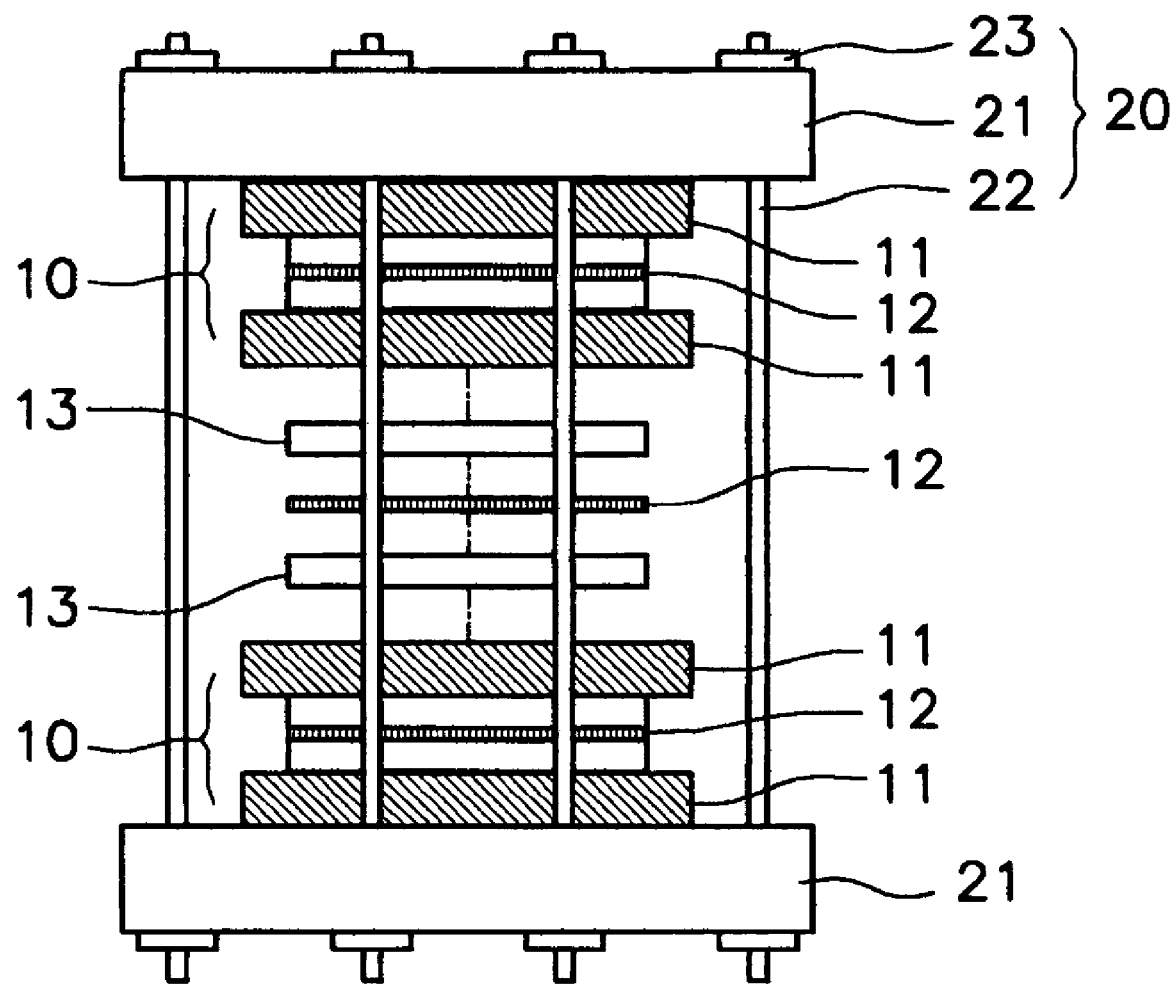
FIG. 1 is a view showing the structure of a conventional polymer electrolyte fuel cell.
Figure 2:
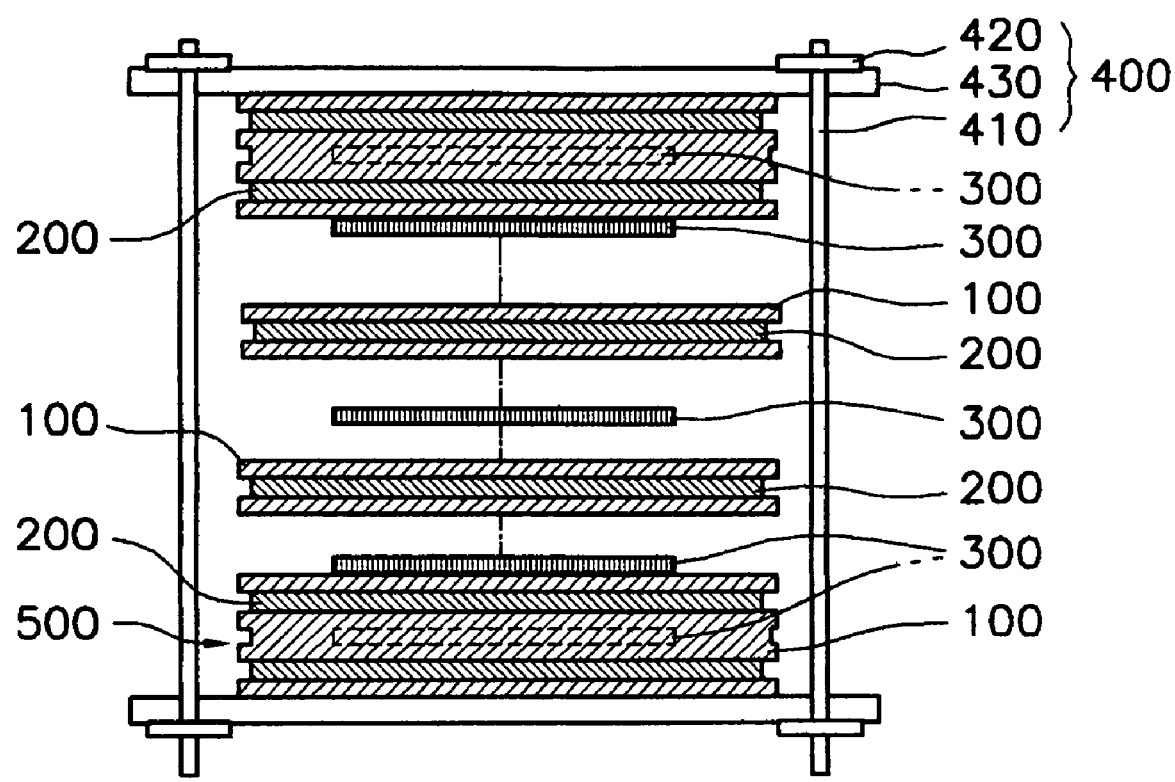
FIG. 2 is a view showing the structure of a polymer electrolyte fuel cell according to an embodiment of the present invention.
Figure 3:
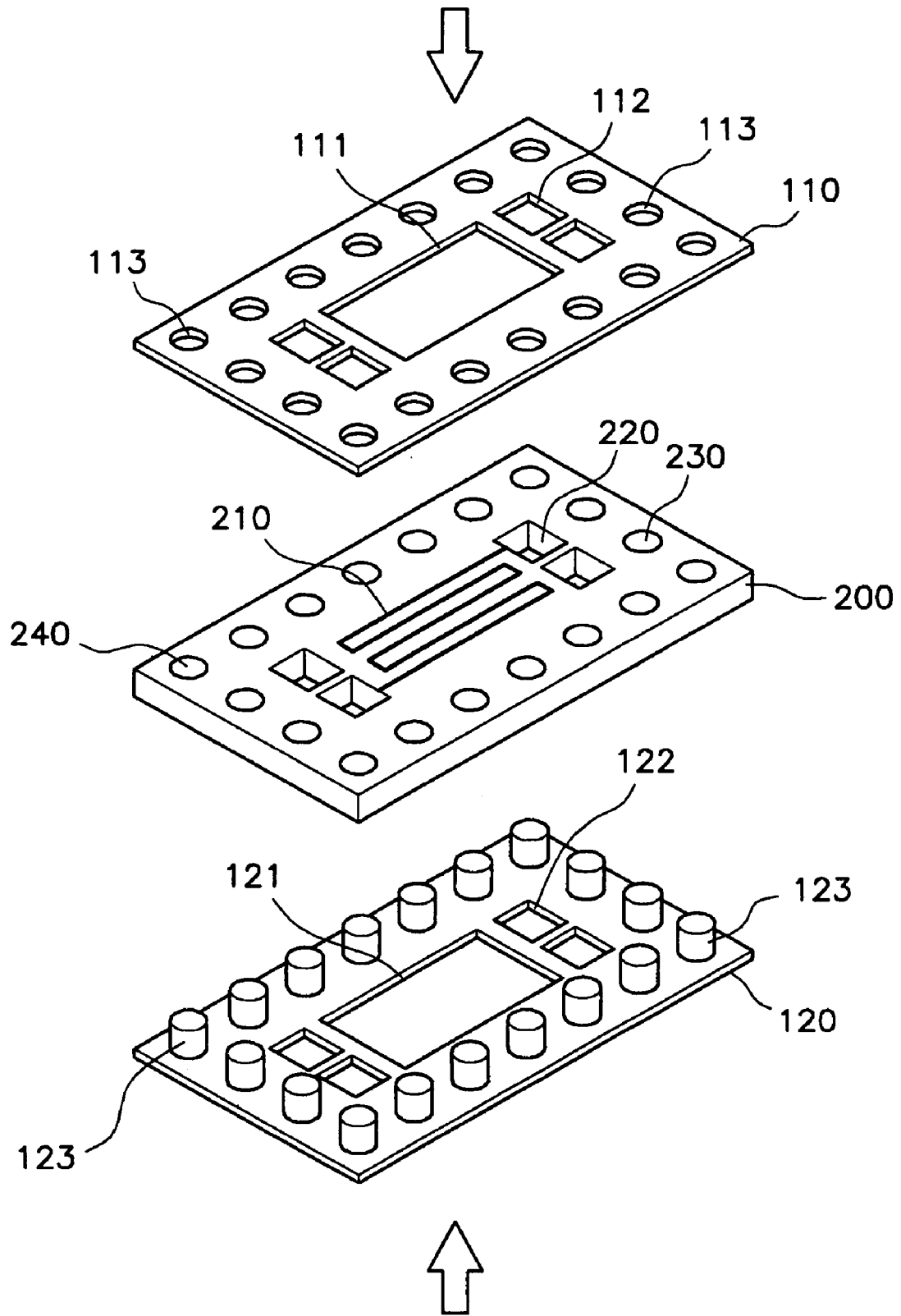
FIG. 3 is an exploded perspective view showing an embodiment of a coupler and a separator plate in the polymer electrolyte fuel cell of the present invention.
Figure 4:
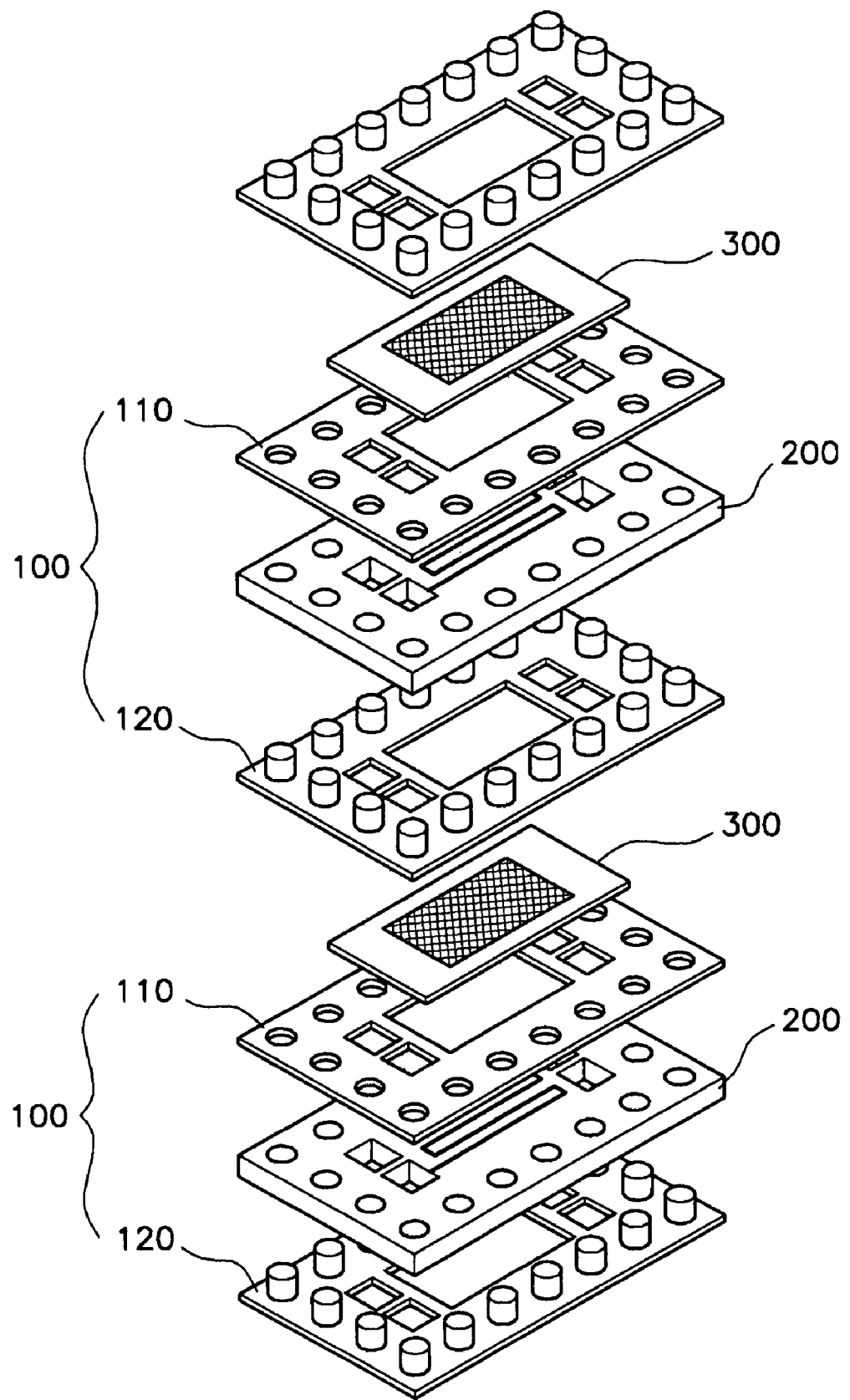
FIG. 4 is an exploded perspective view of a stack for the polymer electrolyte fuel cell according to the embodiment of the present invention.

FIG. 2 is a view showing the structure of a polymer electrolyte fuel cell according to an embodiment of the present invention, FIG. 3 is an exploded perspective view showing an embodiment of a coupler and a separator plate in the polymer electrolyte fuel cell of the present invention, and FIG. 4 is an exploded perspective view of a stack for the polymer electrolyte fuel cell according to the embodiment of the present invention. The stack for the fuel cell of the present invention comprises a plurality of stacked unit cells each of which includes a conductive separator plate 200 formed with flow passages 210 and manifolds 220 for gas supply, a coupler 110 and 120 (hereinafter, collectively designated by 100) attached to both sides of the separator plate 220 and formed with openings 111 and 121 and penetrating passages 112 and 122 to expose the manifolds 220 and the flow passages 210, and a membrane-electrode assembly 300 disposed between assemblies of the conductive separator 200 and the coupler 100.

The coupler 100 is made of thermoplastic elastomer including PP/EPDM, NBRIPP, polyurethane, polyester, polyamides and the like to perform insulation and sealing functions.

The openings 111 and 121 of the coupler 100 are formed such that air and fuel electrodes (not shown) of the membrane-electrode assembly 300 partially penetrate therethrough.

As shown in FIGS. 3 and 4, the coupler 100 comprises one side plate 120 formed with the opening 121 and the penetrating passages 122 to expose the flow passages 210 and the manifolds 220 of the separator plate 200 and with coupling bosses 123 along an periphery thereof; and the other side plate 110 formed with the opening 111 and the penetrating passages 112 to expose the flow passages 210 and the manifolds 220 of the separator plate 200 and with coupling holes 113 that receive the coupling bosses 123 of the side plate 120 along an periphery thereof. The separator plate 200 also has a periphery formed with through-holes 230 through which the coupling bosses 123 penetrate. Thus, the coupling bosses 123 can be fitted into the coupling holes 113 with the separator plate 200 interposed between the two side plates.

The separator plate 200 and the coupler 100 are coupled to each other by heating and pressing them. Since the coupling bosses 123 are fitted into the coupling holes 113 and then firmly coupled thereto by heating and pressing as described above, there is no need for large force for stack coupling contrary to conventional high-tension bolts.

Meanwhile, it is preferred that contact surfaces of the separator plate 200 and the coupler 100 are treated by physical processing such as grinding or sand blasting, or chemical processing such as etching, thereby improving sealing performance.

In such a way, a stack of a plurality of unit cells can have a desired number of stacked unit cells. Then, a fixing unit 400 fixes the stack of the unit cells at both ends thereof to complete a fuel cell.

The fixing unit 400 includes end plates 430 disposed at the both ends of the stack, bolts 410 for connecting the end plates 430 to each other, and nuts 420 for securing the bolts 410.

Figure 5:
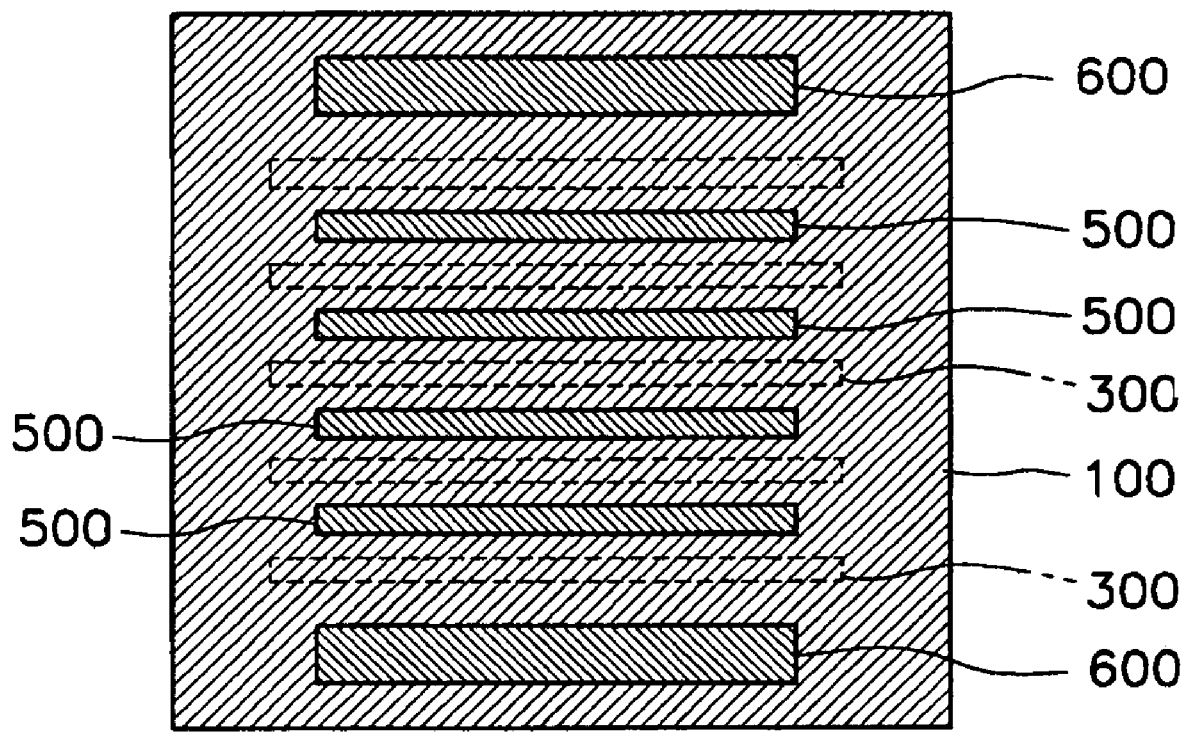
FIG. 5 is a view showing the structure of a fuel cell and a stack therefor according to another embodiment of the present invention.
Figure 6:
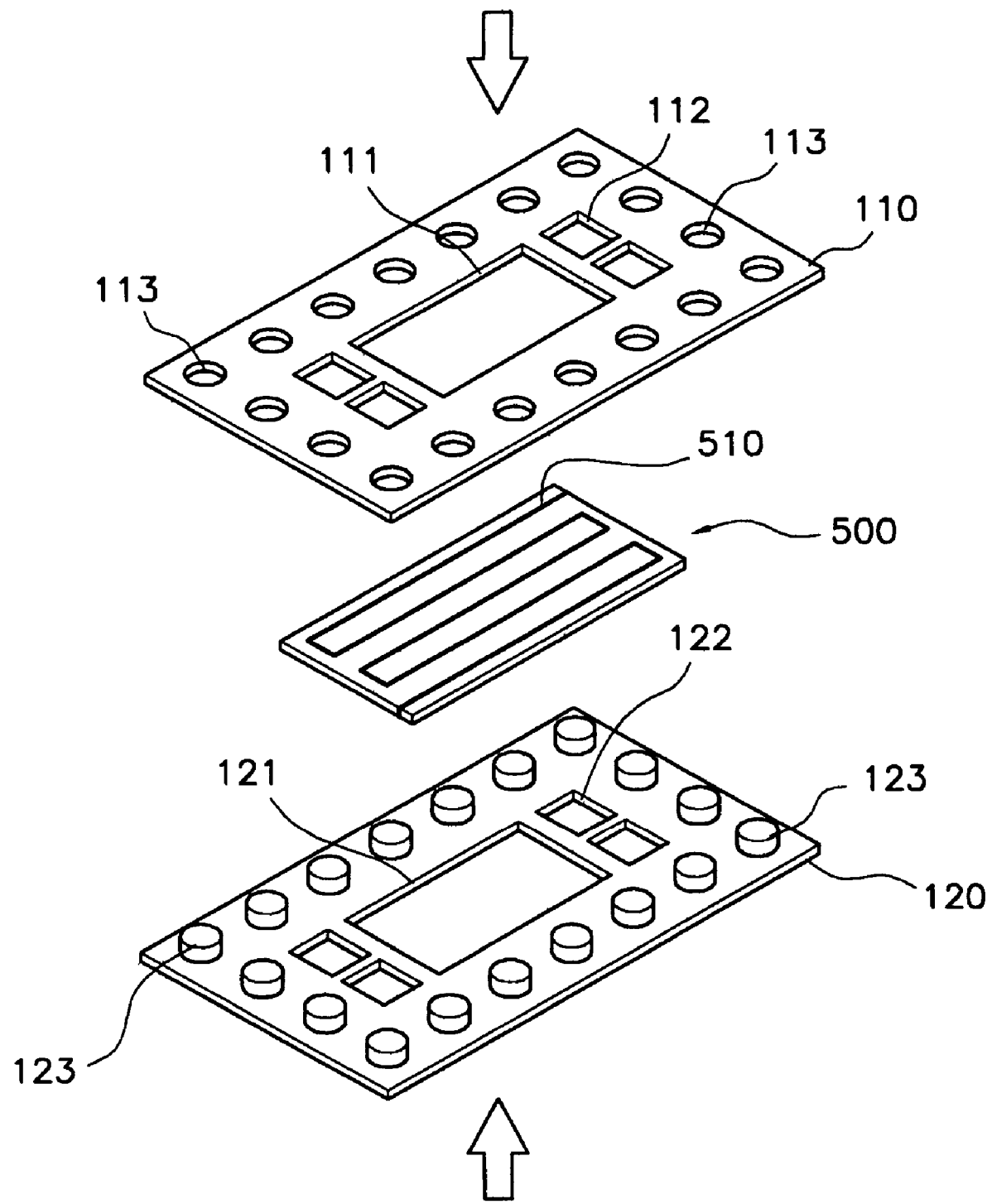
FIG. 6 is an exploded perspective view showing an embodiment of a coupler and a flow passage plate.
Figure 7:
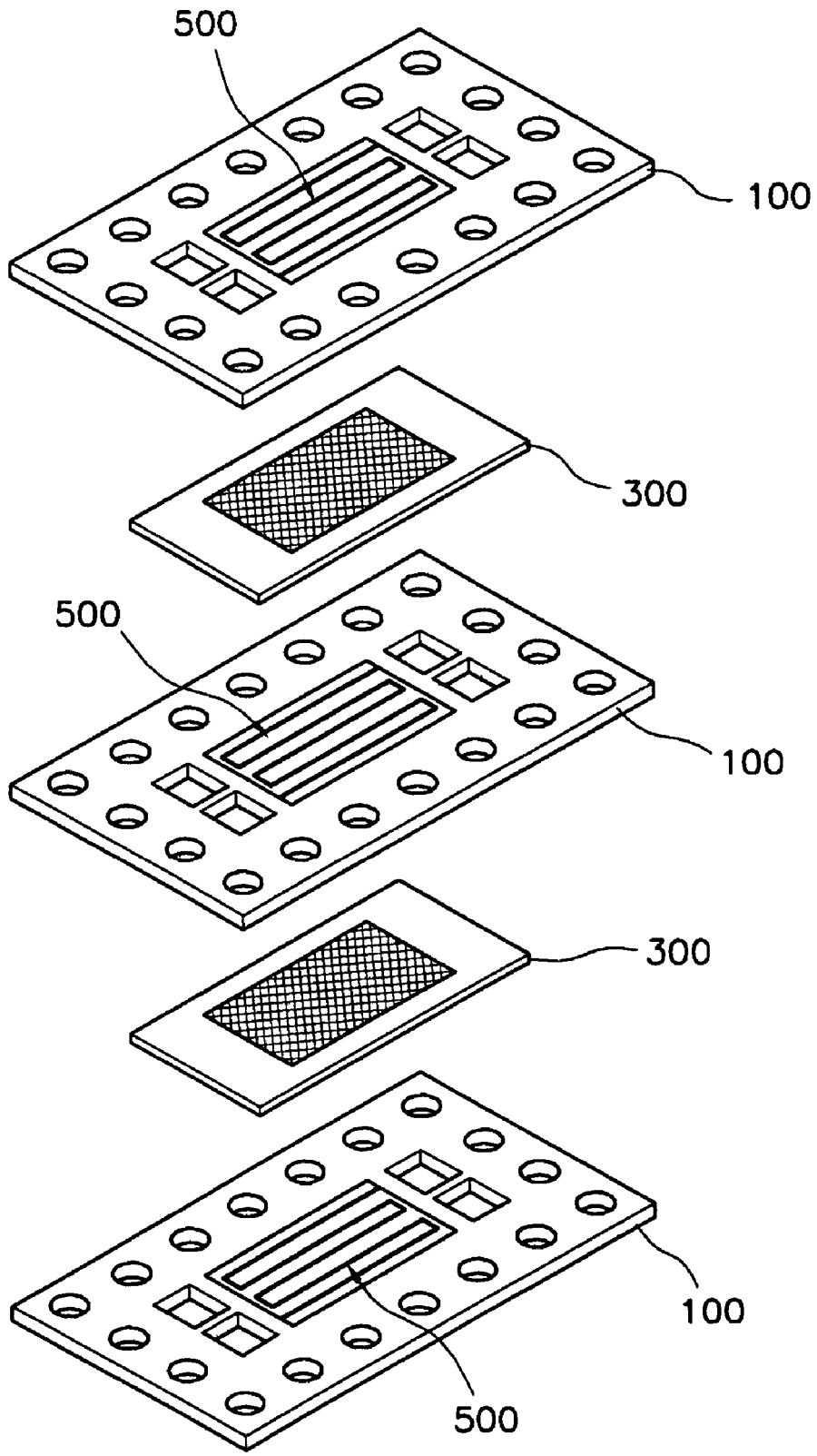
FIG. 7 is an exploded perspective view of a stack for a polymer electrolyte fuel cell according to a further embodiment of the present invention.

FIG. 5 is a view showing the structure of a fuel cell and a stack therefor according to another embodiment of the present invention, FIG. 6 is an exploded perspective view showing an embodiment of a coupler and a flow passage plate, and FIG. 7 is an exploded perspective view of a stack of a polymer electrolyte fuel cell according to a further embodiment of the present invention. The polymer electrolyte fuel cell of the present invention comprises a plurality of couplers 100 each of which is formed by coupling one side plate 110 to the other side plate 120, which are provided with inner rectangular openings 111 and 121 and peripheral penetrating passages 112 and 122, via coupling holes 113 and coupling bosses 123 thereof; conductive flow passage plates 500 each of which has flow passages 510 formed therein and is disposed on the side of the openings 111 and 121 between the side plates 110 and 120 of the relevant coupler 100; and membrane-electrode assemblies 300 disposed between adjacent couplers 100. The membrane-electrode assemblies 300 are disposed between and attached to the adjacent couplers 100 by heating and pressing.

That is, these embodiments are constructed in such a manner that, instead of separator plates for an electrolyte, each of the flow passage plates 500 formed with the flow passages therein is positioned on the side of the openings 111 and 121 of the relevant coupler 100 which in turn encloses the flow passage plate 500.

As shown in FIG. 7, the coupler 100 and the flow passage plate 500 may be formed integrally with each other. The stack and the fuel cell having the same are obtained by positioning the membrane-electrode assemblies 300 between adjacent couplers 100 with the flow passage plates integrally formed therewith and by coupling them to one another.

In these embodiments, since the couplers 100 enclose all of the flow passage plates 500 and the membrane-electrode assemblies 300 as shown in FIG. 5, the outermost flow passage plates 600 serve as end plates. Thus, there is no need for an additional fixing unit upon constructing a fuel cell. Accordingly, it is possible to exclude conventional parts such as end plates, bolts and nuts.

Next, the operation and effects of the present invention will be described with reference to FIGS. 2 to 7.

As described above, the present invention utilizes the couplers 100 made of thermoplastic elastomer, instead of gaskets for ensuring the sealing of the conductive separator plates 200 serving as current collectors and fuel supply passages, so that the couplers are heated and pressed against the separator plates 200 on the both sides of each separator plate, or are heated and pressed to enclose the outsides of the flow passage plates 500 with only the flow passages formed therein. Thus, there is no need for an additional fixing unit that requires large force.

In an embodiment of the present invention, a polymer electrolyte fuel cell is manufactured in such a manner that a structure is constructed by disposing membrane-electrode assemblies 300 between couplers 100 attached to both sides of a conductive separator plate 200, which is formed with manifolds 220 and flow passages 210 for gas supply, and formed with openings 111 and 121 and penetrating passages 112 and 122 to expose the manifolds 220 and the flow passages 210, and a plurality of structures constructed are repeatedly stacked by bonding the couplers 100 to the separator plates 200 through heating and pressing, thereby simultaneously achieving sealing and configuration of a stack for the fuel cell.

In another embodiment of the present invention, a polymer electrolyte fuel cell is manufactured in the substantially same manner as the previous embodiment except that the flow passage plates 500 are used instead of the separator plates 200.

Upon performing the heating and pressing described above, the stack is put into a heating chamber and then pressed at high temperature. At this time, the heating is performed by inserting hot wires as heating media into the couplers 100.

In this case, cooling water is caused to flow through the flow passages of the separator plates 200, thereby preventing thermal damage to the membrane-electrode assemblies 300.

According to the polymer electrolyte fuel cell of the present invention described above, the stack for the fuel cell is constructed by coupling the thermoplastic elastomer parts to one another, resulting in exclusion of the use of end plates and a fixing unit. Thus, there are advantages in that the stack for the fuel cell is simplified in structure and reduced in weight, thereby simplifying processes and reducing costs upon manufacture thereof.

The embodiments are merely examples for specifically describing the technical spirit of the present invention. The scope of the present invention is not limited to the embodiments or the accompanying drawings.

What is claimed is:

1. A stack for a polymer electrolyte fuel cell, comprising:
a plurality of stacked unit cells,
each unit cell including a conductive separator plate formed with flow passages and manifolds for gas supply, a coupler attached to both sides of the separator plate and formed with openings and penetrating passages to expose the manifolds and the flow passages, and a membrane-electrode assembly disposed between the combined separator plate and coupler and another coupler, wherein a periphery of the manifolds generally coincides with a periphery of the openings of the coupler, the coupler comprising:
one side plate formed with at least one of the openings and at least one of the penetrating passages to expose the manifolds and the flow passages of the separator plate and with coupling bosses along a periphery thereof, and
another side plate formed with another of the openings and another of the penetrating passages to expose the manifolds and the flow passages of the separator plate and with coupling holes for receiving the coupling bosses of the one side plate along a periphery thereof.

2. The stack as claimed in claim 1, wherein the separator plate has a periphery formed with through-holes through which the coupling bosses penetrate, and the coupling bosses of the side plate of the coupler penetrate through the through-holes of the separator plate and are then fitted into the coupling holes of the another side plate of the coupler so that the separator plate and the coupler are coupled to each other.

3. The stack as claimed in claim 1, wherein contact surfaces of the separator plate and the coupler are subjected to physical processing including grinding or sand blasting, or chemical processing including etching, thereby improving sealing performance.

4. A stack for a polymer electrolyte fuel cell, comprising:
a plurality of stacked unit cells,
each unit cell including a conductive separator plate formed with flow passages and manifolds for gas supply, a coupler attached to both sides of the separator plate and formed with openings and penetrating passages to expose the manifolds and the flow passages, and a membrane-electrode assembly disposed between the combined separator plate and coupler and another coupler, the coupler comprising:
one side plate formed with at least one of the openings and at least one of the penetrating passages to expose the manifolds and the flow passages of the separator plate and with coupling bosses along a periphery thereof, and
another side plate formed with another of the openings and another of the penetrating passages to expose the manifolds and the flow passages of the separator plate and with coupling holes for receiving the coupling bosses of the one side plate along a periphery thereof.

5. The stack as claimed in claim 4, wherein the separator plate has a periphery formed with through-holes through which the coupling bosses penetrate, and the coupling bosses of the side plate of the coupler penetrate through the through-holes of the separator plate and are then fitted into the coupling holes of the another side plate of the coupler so that the separator plate and the coupler are coupled to each other.

* * * * *